Figure 1:
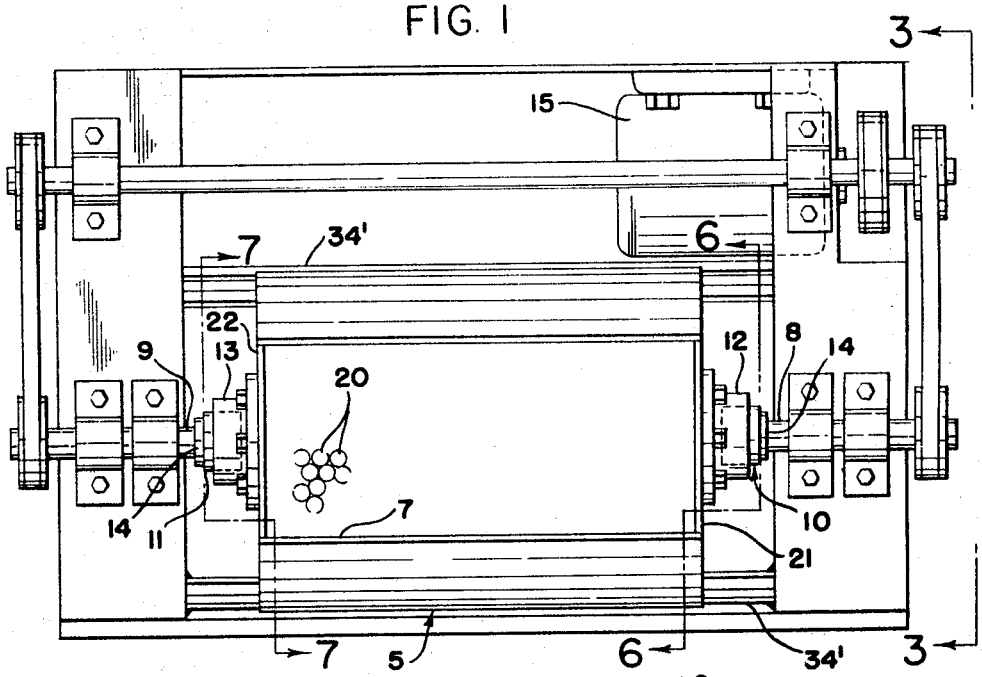

July 16, 1968  F. D. MOORE  3,392,925
VIBRATORY MILL

Original Filed Feb. 7, 1964  3 Sheets-Sheet 1

INVENTOR.
FRANK D. MOORE
BY
ATTORNEY

July 16, 1968

F. D. MOORE 3,392,925

VIBRATORY MILL

Original Filed Feb. 7, 1964

3 Sheets-Sheet 2

INVENTOR.
FRANK D. MOORE
BY
ATTORNEY

July 16, 1968  F. D. MOORE  3,392,925
VIBRATORY MILL

Original Filed Feb. 7, 1964  3 Sheets-Sheet 3

INVENTOR.
FRANK D. MOORE
BY
ATTORNEY

United States Patent Office 3,392,925
Patented July 16, 1968

3,392,925
VIBRATORY MILL
Frank D. Moore, Tallmadge, Ohio, assignor, by mesne assignments, to U.S. Stoneware, Inc., a corporation of Massachusetts
Original application Feb. 7, 1964, Ser. No. 343,330, now Patent No. 3,295,768, dated Jan. 3, 1967. Divided and this application Aug. 4, 1966, Ser. No. 570,221
3 Claims. (Cl. 241—175)

This application is a division of my application Ser. No. 343,330, filed Feb. 7, 1964, and now Patent No. 3,295,768.

This invention relates to a new size-reduction mill.

The size-reduction mill comprises an elongated vessel which includes a shaft connection at each end, the two shafts being parallel. They may be aligned or may be somewhat out of line with one another. On rotation of these shafts, the respective ends of the vessel are moved, without rotation of the vessel, through looped paths which are eccentric with respect to the centers of the respective shafts. A line from the center of one shaft to a point on the path about that center farthest from that center, is not parallel to a line from the center of the other shaft to a point on the other path farthest from that center. Thus, these paths are out-of-phase—one end of the vessel leads the other in execution of the respective paths. These paths may be circular or elliptical or any looped shape which the centers are capable of outlining by any practical movement of the ends of the vessel, such as those movements more particularly described. Usually the paths will be the same, although this is not necessarily so.

As distinguished from ball mills the vessel of the new size-reduction mill is not rotated, but by means of eccentric cams or the like the centers of the ends of the vessel are moved to describe paths which are usually of generally circular contour. Said center at one end of the vessel leads the center at the other end by any angle substantially greater than 0 degree, up to 180 degrees, and more generally between about 5 and 25 degrees, and preferably about 10 degrees. At any angle greater than 90 degrees the operation is generally quite inefficient.

The axis of the vessel is substantially horizontal. The top of the vessel may be open. The vessel contains grinding media similar to those contained in a ball mill.

This type of vibratory mill lends itself to use in a continuous grinding operation. The eccentric motions imparted to the respective ends of the vessel produce vibration of the grinding media with a motion that causes them, in addition to being impacted against one another, to circulate in a generally vertical loop through the material to be ground. The material to be ground is generally of smaller particle size than the grinding media and when fed to the end of the vessel which is moved by the leading eccentric cam, it travels to the opposite end of the vessel moved by the lagging eccentric cam where it is recovered by any suitable means.

The vessel can be of any suitable length and cross section. It can be used for grinding any frangible material, such as minerals, paints, salts, organic chemicals, etc. The grinding media will usually be generally spherical and about ¼ to 1 inch in diameter, but might be as large as 2 inches in diameter or larger, depending upon the size of the vessel, etc. The vessel is most efficiently operated when substantially full of grinding media, the output per any given time and for any given amount of energy consumed, then being at a maximum.

Figure 2:
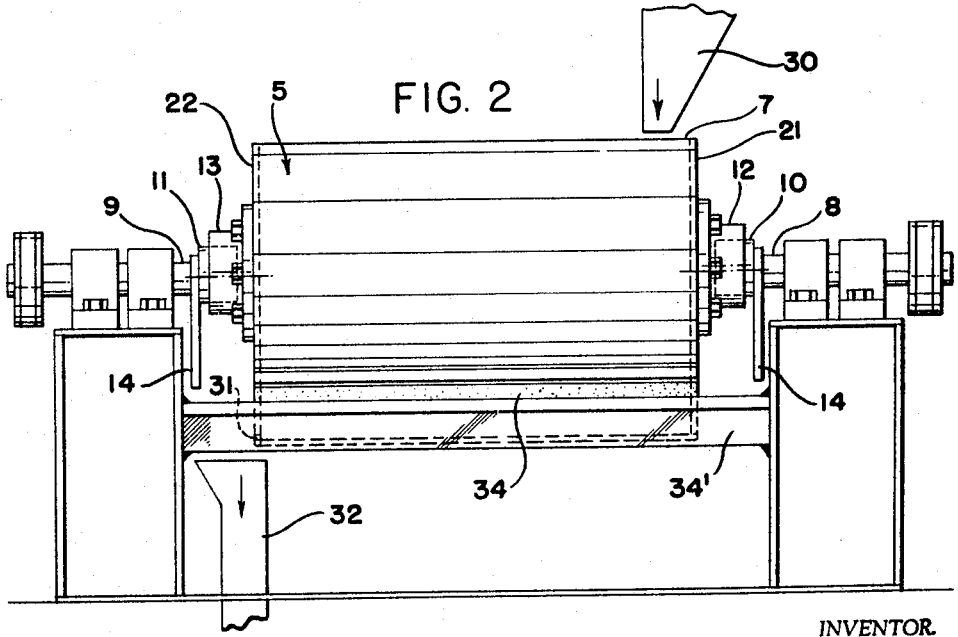
Figure 3:
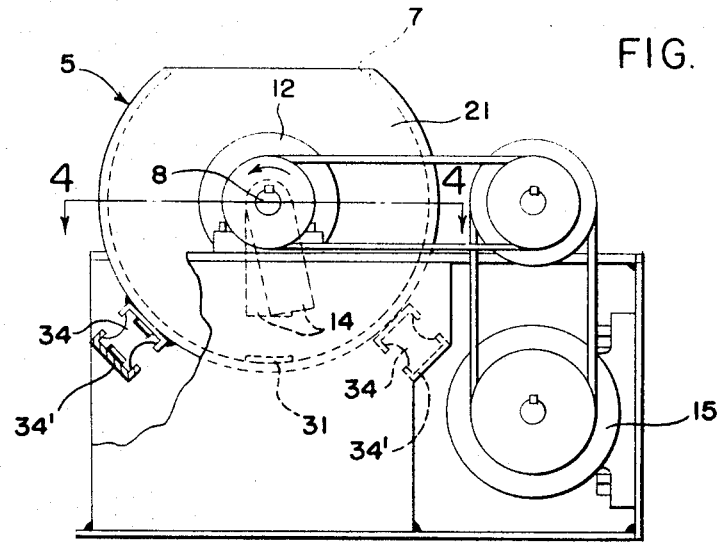
Figure 4:
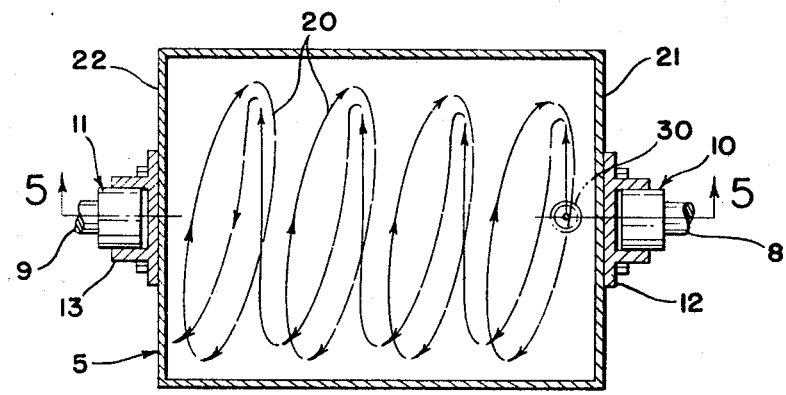
Figure 5:
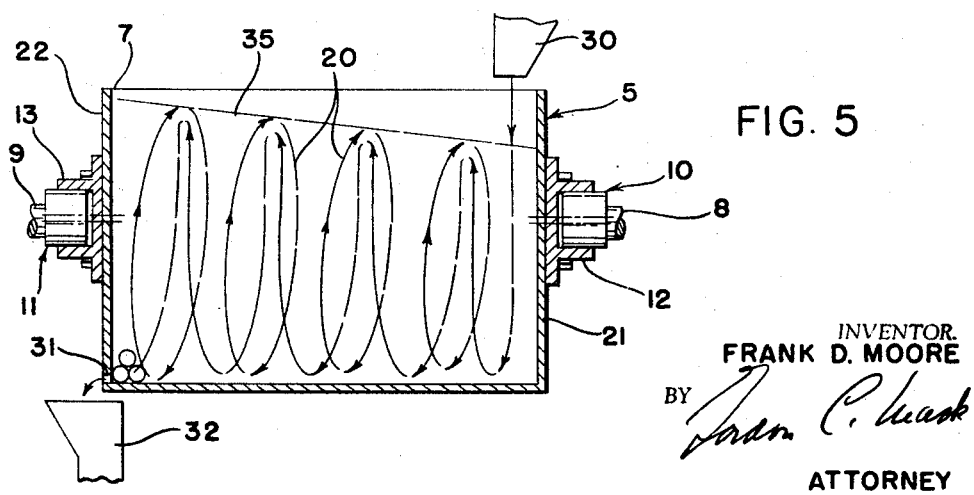
Figure 6:
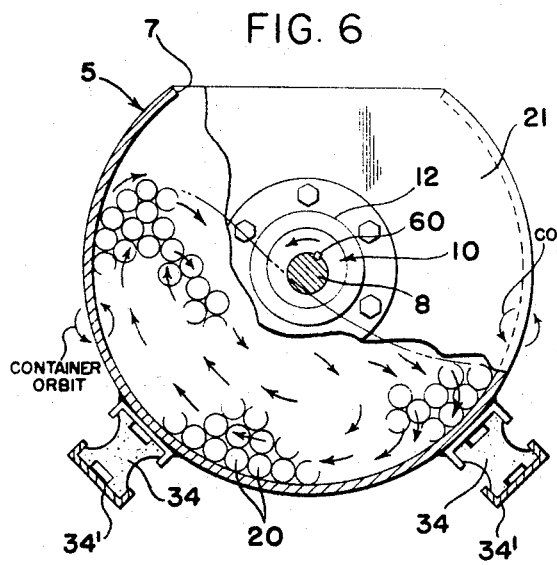
Figure 8:
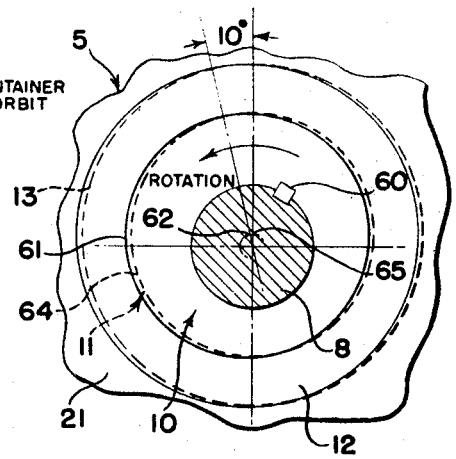
Figure 7:
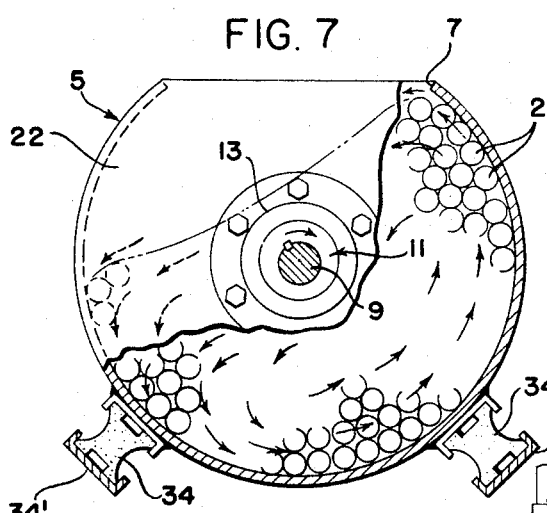
Figure 10:
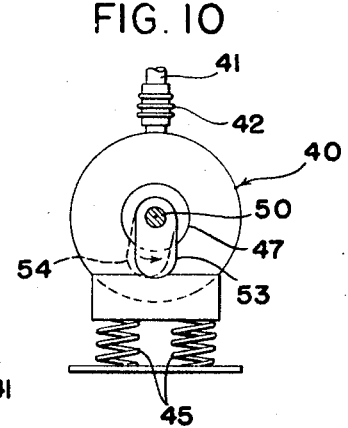
Figure 9:
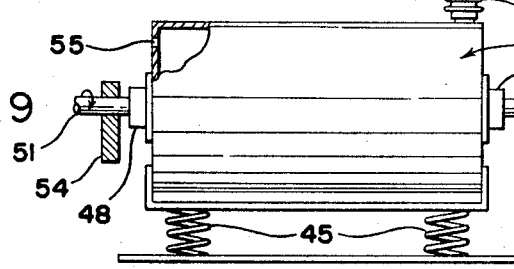

The invention is further described in connection with the accompanying drawings, in which:

FIGURE 1 is a top view of the grinder when not in operation;

FIGURE 2 is a side elevation of the same;
FIGURE 3 is an end elevation of the same on line 3—3 of FIGURE 1;
FIGURE 4 is a schematic view on the line 4—4 of FIGURE 3 when the grinder is operating, and by a spiral indicates the direction of movement of the material being ground, and by relatively circular orbits indicates the paths of the grinding media;
FIGURE 5 is a schematic section on the line 5—5 of FIGURE 4, with a like indication of the orbits of the grinding media and the path of the material to be ground;
FIGURES 6 and 7 are elevations of the opposite ends of the grinder on the lines 6—6 and 7—7 of FIGURE 1, with the end of each partially broken away and indicating by arrows the orbits of the grinding media, and by a single arrow in each figure the different phase angle of displacement in which the centers of the respective ends of the vessel are circulated;
FIGURE 8 is an enlargement of the central portion of one end of the vessel, indicating by an arrow the direction of rotation, and also indicating the eccentricity of the orbital path if the angle of displacement is ten degrees dephased;
FIGURE 9 is a side view of an alternative type of vibratory mill; and
FIGURE 10 is an end view thereof.

The vessel 5 of the grinding equipment has a generally cylindrical bottom, as is clearly shown in FIGURES 3, 6 and 7. It may have an open top 7 as shown, although this is not necessary. The shafts 8 and 9 are at the center of the ends and are generally in line with one another. They are mounted in the eccentric cams 10 and 11 which rotate within housings 12 and 13 which usually are concentric with the respective cams. Counterweights 14 (FIGURE 2) oppose the eccentric mountings.

The shafts 8 and 9 are driven by a common motor 15, through pulleys and belts as indicated in FIGURES 1, 2 and 3.

The vessel contains generally spherical grinding media 20 which may be of the same size and composition as those employed in a ball mill of the same dimensions as the vessel 5, and the number of grinding media will usually be more than employed in such a ball mill of the same vessel volume.

As the shafts 8 and 9 rotate, the two ends 21 and 22 of the vessel move in small orbital paths without the vessel rotating. In FIGURE 6 the arrows marked "Container Orbit" indicate the movement imparted to the vessel by the dephased eccentric mounting which causes vibration in the vessel and in its contents, effecting rapid collision of the grinding media against the portions of the material to be ground which are located between any two of the grinding media as they are brought together.

Referring to FIGURE 2, the feeding hopper 30 supplies the material to be ground, and after grinding this is advantageously removed through the opening 31 (FIGURE 5) in the opposite end of the vessel and deposited on the chute 32. The opening is located at any convenient height and at any convenient location near this end of the vessel. A screen or sieve or other means will usually be provided to retain the grinding media within the vessel. The material may be dry-ground or wet-ground. Liquid and dry material may be supplied through different supply devices of which the device marked 30 is illustrative. The vessel is supported by resilient vibration mounts 34 held in channels 34' fastened to the frame of the mill, as illustrated in FIGURES 1 and 2.

The line 35 in FIGURE 5 illustrates how the contents of the vessel build up at the end of the vessel at which the trailing cam is located. In FIGURES 4 and 5 the general path of the material being ground is indicated as a continuous line which may be described as generally spiral. Assuming the vessel to be eccentrically moved in the direction of the arrows shown in FIGURES 6 and 7, the material being ground after delivery through the supply device 30 will travel to the far side of the vessel (see FIGURES 4 and 5) and then, following the dotted spiral, it will be observed that the material moves forwardly over the bottom of the vessel and then up to the top and then down at the rear and forwardly again. The continuous orbits in FIGURES 4 and 5 show that the grinding media follow down around the bottom of the vessel, and coming up to the top at the front each rolls back over the contents of the vessel (indicated by the line 35) toward the end 21. Thus the grinding media execute a relatively circular orbit, whereas the material to be ground follows a generally spiral path. It is to be understood that the showing in FIGURES 4 to 7 is quite schematic but shows the general course of the material being ground and the grinding media.

How nearly the orbit of the grinding media is circular, and how nearly the path of the material being ground is spiral will, of course, depend upon how full the vessel is and the amount the eccentrics are dephased. FIGURES 6 and 7 illustrate in a general way the orbits followed by the grinding media toward the respective ends of the vessel when the vessel is substantially full. As is natural, the contents of the vessel pile up on the forward wall, and how closely the grinding media traveling within the contents of the vessel follow a circular path depends upon how full the vessel is. The general motion of the grinding media in traveling down and around within the vessel is indicated in FIGURES 6 and 7, and FIGURES 4 and 5 indicate that in traveling across the top of the vessel the grinding media travel back toward the wall 21 about the same amount that they travel forward toward the wall 22 as they travel through the body of the material to be ground. The material being ground always progresses from the end of the vessel at which the leading eccentric is located to that at which the lagging eccentric is located.

FIGURE 8 illustrates on an enlarged scale the interrelation of the elements at one end of the vessel which produce the eccentric motion. The cam 10 is keyed to the shaft 8 by key 60. The center of the leading eccentric outlined by the full line 61 is at the point 62. The center of the lagging eccentric at the opposite end of the vessel and outlined in dotted lines 64 is at 65. The angle at which the eccentrics are dephased is 10 degrees. This angle may be varied as desired.

In the design of vibratory mill illustrated in FIGURES 1 to 7, the amplitude of the ellipse executed by the respective ends of the mill is controlled. In the alternative type of vibratory mill illustrated in FIGURES 9 and 10 this is not true. The vessel 40 is illustrated as being closed at the top. The hopper 41 is connected to the vessel through the flexible hose connection 42, the hopper being rigidly supported by means not shown. The springs 45 on which the vessel is mountde may be metal or rubber or any suitable resilient supporting means. These supports may be suitably located on the sides or at the bottom of the vessel, or the vessel may be suspended by suitable resilient means.

As contrasted with the vessel illustrated in the earlier views, the vessel of FIGURES 9 and 10 is not mounted through eccentric cams, but the bearings 47 and 48 are provided with concentric openings which receive the shafts 50 and 51 which are rotated about their respective axes. The centers of these two shafts are generally aligned with one another, but this is not necessarily so. The two eccentric weights 53 and 54 are rigidly attached to the shafts and rotate with them. The eccentric 53 leads the eccentric 54. The end of the vessel vibrated by the lagging eccentric 54 is provided with suitable discharge means which may simply be an opening 55 near the top thereof. This opening can be located in any suitable position.

The invention is covered in the claims which follow.

I claim:

1. Vibratory grinding equipment which contains spherical grinding media and comprises a horizontal vessel with a substantially cylindrical bottom portion with its opposite ends mounted on cams supported eccentrically on horizontal driving shaft means, said shaft means at the respective ends of the drum being mounted to rotate about a common axis, with the eccentricity of the cam at one end of the vessel leading the angle of eccentricity of the cam at the other end, and means for rotating the shaft means.

2. The equipment of claim 1 in which there are separate driving shafts at the respective ends of the mill.

3. The equipment of claim 1 which includes means for supplying material to be ground at the end of the vessel at which the angle of eccentricity leads, and means at the other end of the vessel for delivery of the ground material therefrom.

References Cited

UNITED STATES PATENTS 3,339,316   9/1967   Rampe _____ 241—175

GERALD A. DOST, *Primary Examiner.*